United States Patent
Fung

(10) Patent No.: US 8,255,860 B1
(45) Date of Patent: Aug. 28, 2012

(54) EXPLOITING INDEPENDENT PORTIONS OF LOGIC DESIGNS FOR TIMING OPTIMIZATION

(75) Inventor: Ryan Fung, Mississauga (CA)

(73) Assignee: Altera Corporation, San Jose, CA (US)

( * ) Notice: Subject to any disclaimer, the term of this patent is extended or adjusted under 35 U.S.C. 154(b) by 138 days.

(21) Appl. No.: 12/751,809

(22) Filed: Mar. 31, 2010

Related U.S. Application Data

(60) Provisional application No. 61/166,645, filed on Apr. 3, 2009.

(51) Int. Cl.
*G06F 17/50* (2006.01)
*G06F 9/455* (2006.01)
(52) U.S. Cl. ......... 716/134; 716/108; 716/113; 716/122
(58) Field of Classification Search ........................ None
See application file for complete search history.

(56) References Cited

U.S. PATENT DOCUMENTS

| | | | | |
|---|---|---|---|---|
| 5,003,487 A | * | 3/1991 | Drumm et al. | 716/104 |
| 5,396,435 A | * | 3/1995 | Ginetti | 716/104 |
| 5,397,749 A | * | 3/1995 | Igarashi | 716/113 |
| 5,608,645 A | * | 3/1997 | Spyrou | 716/113 |
| 5,659,484 A | * | 8/1997 | Bennett et al. | 716/113 |
| 5,666,290 A | * | 9/1997 | Li et al. | 716/113 |
| 6,763,506 B1 | | 7/2004 | Betz et al. | |
| 7,093,219 B1 | * | 8/2006 | Hutton | 716/113 |

\* cited by examiner

*Primary Examiner* — Leigh Garbowski
*Assistant Examiner* — A. M. Thompson
(74) *Attorney, Agent, or Firm* — Weaver Austin Villeneuve & Sampson LLP

(57) ABSTRACT

Slacks or timing weights are determined during implementation of an electronic design to improve design optimization. Multiple failings paths are optimized simultaneously by generalizing the notion of constraint relaxation used when computing slacks and timing weights to apply to portions of the design that can be independently optimized, rather than strictly adhering to clock domains and other coupled timing constraints used by conventional relaxation-based approaches. Improved calculation of slacks or timing weights better guides optimization algorithms.

24 Claims, 12 Drawing Sheets

--RELATED ART--

EXPLOITING INDEPENDENT PORTIONS OF LOGIC DESIGNS FOR TIMING OPTIMIZATION

CROSS REFERENCE TO RELATED APPLICATIONS

This application claims priority under 35 U.S.C. §119(e) to U.S. Provisional Application No. 61/166,645 filed on Apr. 3, 2009 and titled Effective And Efficient Timing Optimization By Exploiting Independent Portions Of Logic Designs, the entirety of which is incorporated by reference herein for all purposes.

TECHNICAL FIELD

The present disclosure relates to efficient and effective timing optimization by exploiting independent portions of logic designs.

DESCRIPTION OF RELATED ART

Electronic design automation ("EDA") is becoming increasingly complicated and time consuming, due in part to the greatly increasing size and complexity of the electronic devices designed by EDA tools. Such devices include general purpose microprocessors as well as custom logic devices including Application Specific Integrated Circuits ("ASICs"). Examples of integrated circuits include non-programmable gate arrays, field programmable gate arrays ("FPGAs"), and complex programmable logic devices ("PLDs" or "CPLDs"). The design of even the simplest of these devices typically involves generation of a high level design, logic simulation, generation of a network, timing simulation, etc.

Meeting timing requirements is required for proper operation of an electronic device. Implementing a source electronic design onto a hardware device includes placement and routing. Placement and routing involves assigning logic elements in a source electronic design to locations on the target device and selecting programmable routing resources to connect those logic elements. Most circuit optimization techniques including those that occur during placement and routing rely on identifying "critical connections" between circuit elements or blocks. A delay for a path will be the sum of delays on its constituent connections. Critical paths include signal paths having delays that may limit the performance of an entire design. There may be several critical paths in a circuit. The cycle time of the clock that controls various circuits at the beginning and end of the path can not be any less than this critical path delay.

Prior approaches have computed the criticality of a connection based on its slack. The slack of a connection is the amount of delay that could be added to a connection without causing any timing constraint violation. Negative slacks indicate that the calculated path timing exceeds the timing constraint. Criticality is typically defined to be a decreasing function of slack. Connections with low, zero, or negative slack have a high criticality.

As electronic designs become increasingly complex, optimization algorithms take into account a high number of relationships between an increasingly large number of logic blocks. Conventional mechanisms for performing optimization including timing optimization are limited. Consequently, it is desirable to provide improved mechanisms for performing timing optimization.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
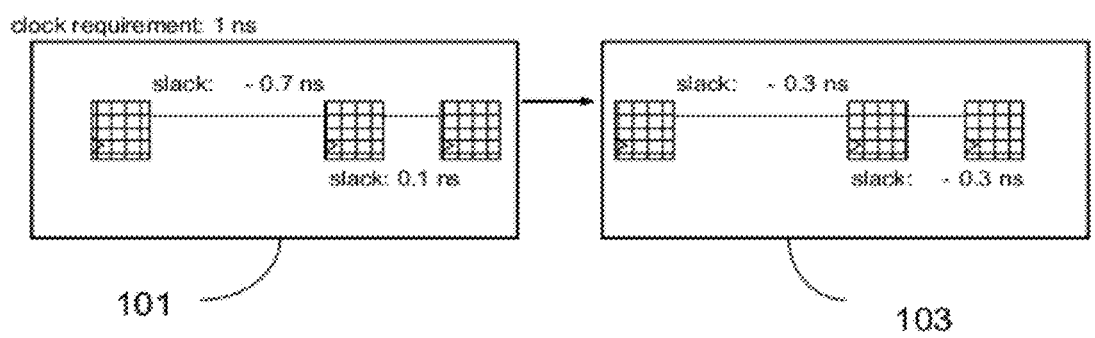
FIG. 1 is a schematic depiction of two possible solutions to an optimization algorithm.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of programmable chips including Field Programmable Gate Arrays (FPGAs). However, it should be noted that the techniques of the present invention can be applied to a number of different devices including Application Specific Integrated Circuits (ASICs) and Application Specific Standard Products (ASSPs) and a number of different device implementation options including custom, standard-cell, gate-array, and structured-ASIC implementations. Various embodiments will also use the term slack and slack ratios. It will be understood that slack and slack ratios refer to any metric that measures how closely two logic blocks must be coupled on a device. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Slacks or timing weights are determined during implementation of an electronic design to improve design optimization. Multiple failings paths are optimized simultaneously by generalizing the notion of constraint relaxation used when computing slacks and timing weights to apply to portions of the design that can be independently optimized, rather than strictly adhering to clock domains and other coupled timing constraints used by conventional relaxation-based approaches. Improved calculation of slacks or timing weights better guides optimization algorithms.

Example Embodiments

A representation of an electronic design includes various blocks, specification of the functionality of the various blocks, and connections within the electronic design. Each of the connections forms part of one or more paths through at least a portion of the electronic design. Various paths have associated timing constraints. One technique of timing analysis currently used in circuit optimization estimates the slack of each connection to determine which connections are critical and therefore need to be made or placed using fast wiring lines to avoid slowing down a device. For example, in implementing a design into a programmable logic device, a placement and routing tool would assign the source design logic elements to individual locations on the device and specify the routing resources used to connect them. To minimize delay in a hierarchical architecture device, the connection between logic elements might use a local connection, i.e. occurring within the same logic array block ("LAB"), as the "fast" wiring. In other devices, the "fast" wiring might be implemented by minimizing the length of the connection between the two logic elements.

Conventional relaxation-based techniques involve attempting to optimize each clock domain independently. Extra effort is made during optimization to ensure that connections with the highest criticality have their timing optimized. The criticality may be computed as a function of slack ratio for electronic systems with multiple timing constraints. Connections typically lie on multiple paths, each of which is potentially governed by a different timing constraint.

The slack ratio of a connection is the minimum slack ratio of all the paths that pass through that connection. The slack ratio of a path is the slack (potentially based on a relaxed timing constraint) of that path divided by the magnitude of the timing constraint (or relaxed timing constraint) applicable to that path. Slack, slack ratios, and other metrics indicating the amount of delay that can be added to a path without causing violation of any timing constraint relevant to that path are referred to herein equivalently as slacks or slack ratios. Being able to measure the quality of a proposed solution or the quality change associated with a transformation is a fundamental feature of all timing-optimization algorithms. Many algorithms use slacks or weights derived from slacks to guide optimization. The use of raw slacks (which can be negative) in many algorithms has been unsuccessful, leading to poor optimization quality.

For example, one common technique involves clipping all negative slacks to 0, to make the optimization algorithm think that all paths that are failing timing need to be repaired. Conventional techniques based on relaxation can be employed to refine slacks, and compute favorable weights, to facilitate good and robust optimization. These techniques addressed many of the shortcomings associated with the use of raw slacks in optimization algorithms.

For example, it is common to temporarily consider suboptimal solutions. It can be beneficial under these circumstances to focus the optimization algorithm on the worst-case failures and gradually move to fix the less severe failures once the worst failures are resolved. This avoids situations where an algorithm is "frozen"; that is, many modifications look unfavorable because each would de-optimize some paths that are already failing or close to failing, or no modifications look promising because no modification would fix a timing failure. Conventional relaxation-based techniques can be used when the user over-constrains a design to figure out its maximum performance, and/or when the timing model used for optimization is different from the one used to report the final result.

When the user over-constrains a design, the user is often trying to determine the maximum achievable performance (or minimum cycle time). In this scenario, every connection or path in the design can look like it is failing timing because the timing constraint may not be achievable. This can be highly detrimental to algorithms that try to minimize failures as opposed to minimizing the magnitude of the largest failure.

In FIG. 1, an algorithm that minimizes failures would select the solution 101, with only one path failing timing. The solution 103, however, would run at 769 MHz, while the solution 101 would run at 588 MHz. So, for a user that is trying to determine the maximum performance of the design, conventional relaxation-based techniques can be helpful because they focus optimization on the worst failing paths rather than trying to minimize failure count. To achieve this, the current clock period is determined and a required time equal to the larger of the current clock period and the user-requested clock period is computed. Timing analysis is then performed with that required time to determine edge slacks that are in turn normalized by the required time.

This process produces "slack ratios" that are between 0 and 1. The minimum slack ratio will be equal to 0, if the current clock period is greater than or equal to the user-requested clock period. The minimum slack ratio will be greater than 0, if the current clock period is less than the user-requested clock period. The path that is the most performance limiting (with respect to the clock period) will have the minimum slack ratio. A path with zero delay will get a slack ratio of 1, and will consequently, be the least performance limiting. Paths in between will have linearly assigned slack ratios.

By computing slack ratios in this manner, an optimization algorithm can conveniently focus on improving the timing paths that are the most performance limiting by using the slack ratios directly or further processing them into weights. In the process, it may de-optimize paths that are already failing timing but are further from being performance limiting. This approach tends to produce results with maximized performance (or minimized cycle time). This may be desirable for users over-constraining a design. Note that the optimization algorithm only needs to focus and be tuned to optimize connections with slack ratios close to 0, regardless of whether the design solution is currently failing timing and/or the timing constraint is impossible to achieve. Algorithms are simplified and benefit from this stable view of what to optimize.

As mentioned earlier, the conventional relaxation-based approach is also beneficial in cases where the timing model used during optimization anticipates larger delays than those achieved. In that case, if the optimization algorithm focuses on minimizing failures, rather than focusing on the performance limiting path, it may end up optimizing false failures—cases where the optimization algorithm sees a timing failure where none exists. And by not focusing on the performance limiting path, the timing performance of the design may suffer. That is, as long as the fidelity of the timing model is reasonable, even if the absolute error is large, by focusing on the paths with lowest slack ratios, the algorithm will tend to probabilistically improve the performance limiting path, even if it does not know precisely which path that is, and/or how much slack it actually has.

The major problem with the conventional relaxation-based technique is it can end up not optimizing a portion of the design that is failing timing because another portion of the design is more severely failing timing. If the two portions of the design do not compete for resources, etc., this de-optimization comes without benefit; the optimization algorithm could reduce or repair the timing failure without sacrificing the quality of the performance-limiting path. This can be a significant problem for several reasons. The performance-limiting path may be impossible to improve, it may be incorrectly predicted, and it may be temporary (present only in the current iterations of an iterative improvement algorithm).

In some cases, designs pending further designer-level optimization and/or designs with inaccurate timing constraints that are pending user refinement may have performance-limiting paths that can not be further improved. Nevertheless, there may be other paths that are failing timing that could be improved, except conventional relaxation-based approaches will not consider those paths as important to improve because they appear far less performance limiting than the critical path. This can be frustrating for designers that expect the optimization tool to do as good a job at optimizing the timing of all circuitry as it can (minimizing failures without sacrificing the quality of the current performance-limiting paths).

Figure 2:
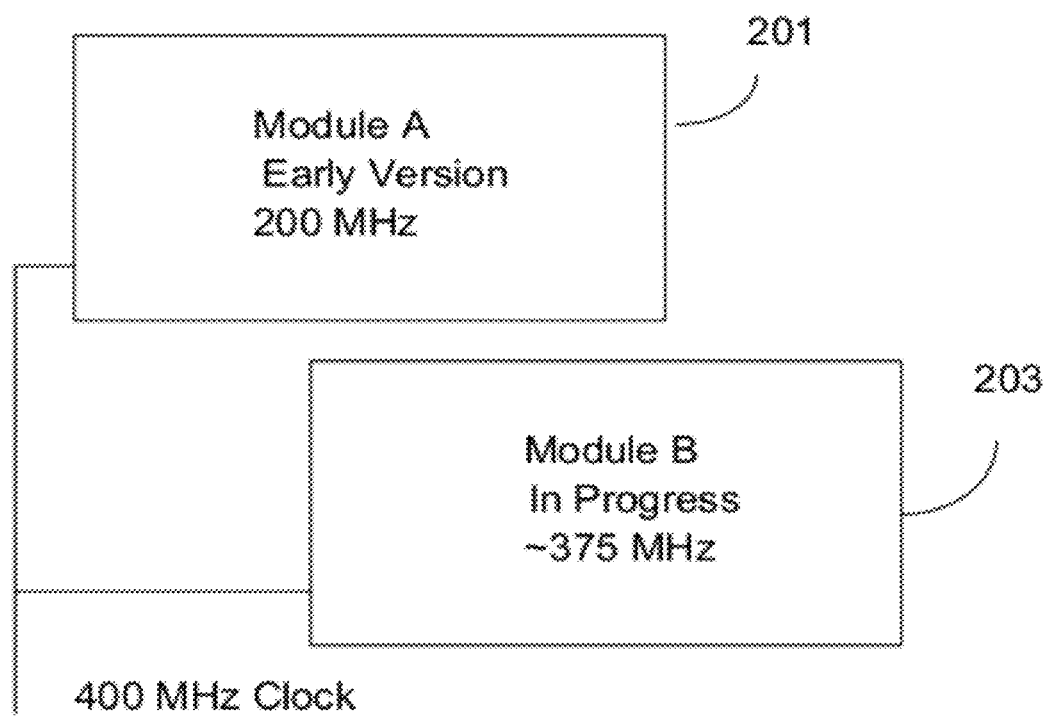
FIG. 2 is a diagrammatic representation showing a system clock feeding two modules.

Consider the example design in FIG. 2 which has a 400 MHz system clock feeding two modules. In this example, the designer has an early version of module A (201), which currently can only run at a maximum speed of 200 MHz, because it is pending further straightforward design enhancements. The designer would like to close timing on more challenging module B (203) in the presence of module A (201), but the optimization of module B will be seriously limited by the current performance-limiting paths in module A (because both modules are constrained by the same set of coupled timing constraints, fed by the same clock). This can be very frustrating for a designer.

A similar situation (not illustrated) occurs when a designer sets tentative, but impossible-to-meet IO constraints (pending finalization of their board traces) or leaves out multicycle constraints early in the design cycles. Design optimization of seemingly unrelated portions of the design can be inhibited based on coupled timing constraints. Delay models used during optimization may be simplified to improve optimization runtime. Consequently, the performance-limiting path identified during optimization may not correspond with the actual performance limiting path. With large delay modeling fidelity errors, the conventional relaxation-based approach could result in significant de-optimization of seemingly non-critical paths that may, in fact, be critical. Usually, delay models are reasonably accurate, so this is generally not a serious issue. However, it can affect ultimate performance.

In other cases, early optimization results may be not be representative of final solution quality. Consequently, the paths which are non-critical early on may become critical as optimization proceeds. This can be a problem for the conventional relaxation-based techniques if the early optimization results are far from optimal. It may take many iterations before the final critical paths are exposed, and the optimization runtime can suffer, or solution quality may suffer if the algorithm terminates after a fixed number of iterations. This applies to modern logic designs which can be very large, and often are constructed from a large number of sub-modules that are all pushing performance. During flat compiles, these sub-modules all need to be optimized to achieve the desired performance target, and during early stages of optimization, many may still be missing their performance target to different extents. It is undesirable if only the most performance limiting sub-modules are optimized, with the other sub-modules are ignored, or de-optimized, if those other sub-modules are failing timing and their optimization is mostly independent of the performance-limiting sub-modules.

According to various embodiments of the present invention, techniques for generating edge weights or slack ratios are disclosed that do not suffer from the limitations of conventional relaxation-based approaches, while still preserving its benefits. These techniques allow an optimization algorithm to optimize more failing paths simultaneously to greatly reduce the likelihood that incorrectly predicted or impossible-to-improve critical paths will hinder optimization quality, and temporary critical paths will impede optimization progress. This is achieved by generalizing the notion of constraint relaxation to apply to portions of the design that can be independently optimized, rather than strictly adhering to clock domains and other coupled timing constraints that conventional relaxation-based approaches use.

The conventional relaxation techniques consider distinct clocks (clock domains) and coupled timing constraints when deciding which portions of a design to independently relax. Therefore, a relaxation boundary will exist between two independent clock domains and the logic in those clock domains will be assigned to distinct relaxation groups, according to various embodiments.

By relaxing each clock domain independently, conventional relaxation-based techniques facilitate independent maximization of clock performance. This can be important when one is interested in maximizing the performance of all clocks, rather than the slowest performing clock. If all the clocks requirements were relaxed based on the worst-performing clock, clock domains that are meeting timing or close to meeting timing may be de-optimized in a futile attempt to concentrate optimization effort on the worst performing clock. Generally, clock domains are sufficiently independent that one can be optimized without de-optimizing another (optimization of clocks is not zero sum). Generally, communication between clock domains requires either synchronizers or tight timing transfers. Consequently, inter-clock communication is generally minimized and constrained to limited parts of a design, so the bulk of the logic in each of two distinct clock domains is generally decoupled.

Before describing various embodiments in more detail, some more terminology will be clarified. For analysis and constraining purposes, a clock domain may be divided into smaller sub-domains that are processed separately for convenience. For example, a sub-domain may be created for half-cycle transfers, and another may be created for multi-cycle transfers. In this case, "coupled constraints" refer to timing constraints on each of these sub-domains that should be relaxed together and proportionally, if any are relaxed. That is because they all relate back to the same clock, to maximize performance of that clock, all the "sub-domains" should be consistently constrained.

To address the problems identified, rather than restricting relaxation boundaries to clock domains or coupled timing constraints, it is beneficial to define smaller portions of the design that can be relaxed independently.

Identifying portions of the design that can and should be optimized independently is challenging. It can be based on several criteria. One of them is to look for disjoint portions of the timing graph. In general, not every connection in a design is timing analyzed. Some timing paths are not timing analyzed because they go between asynchronous clocks, and some timing paths may be false paths that are cut by the user. If two portions of the timing graph are completely disjoint or are only connected by edges that are not subject to analysis, then it may be assumed that those two portions of the design can be optimized independently. That is, relaxation boundaries should be drawn around those two portions of the design because optimization of one group of logic should not inhibit optimization of the other. "Relaxation group" will be the term used to refer to a group of edges/nodes/logic that should be relaxed independently. Note that relaxation groups may be identified considering, separately, the logic within each clock domain or coupled set of timing constraints, or they may be identified considering the design as a whole. Given that clock domains are almost always "mostly" independent, carving the relaxation groups within clock domains should produce similar results to carving them considering the design as a whole because the latter, if it works well, should end up roughly re-forming the clock domain boundaries.

Figure 3:
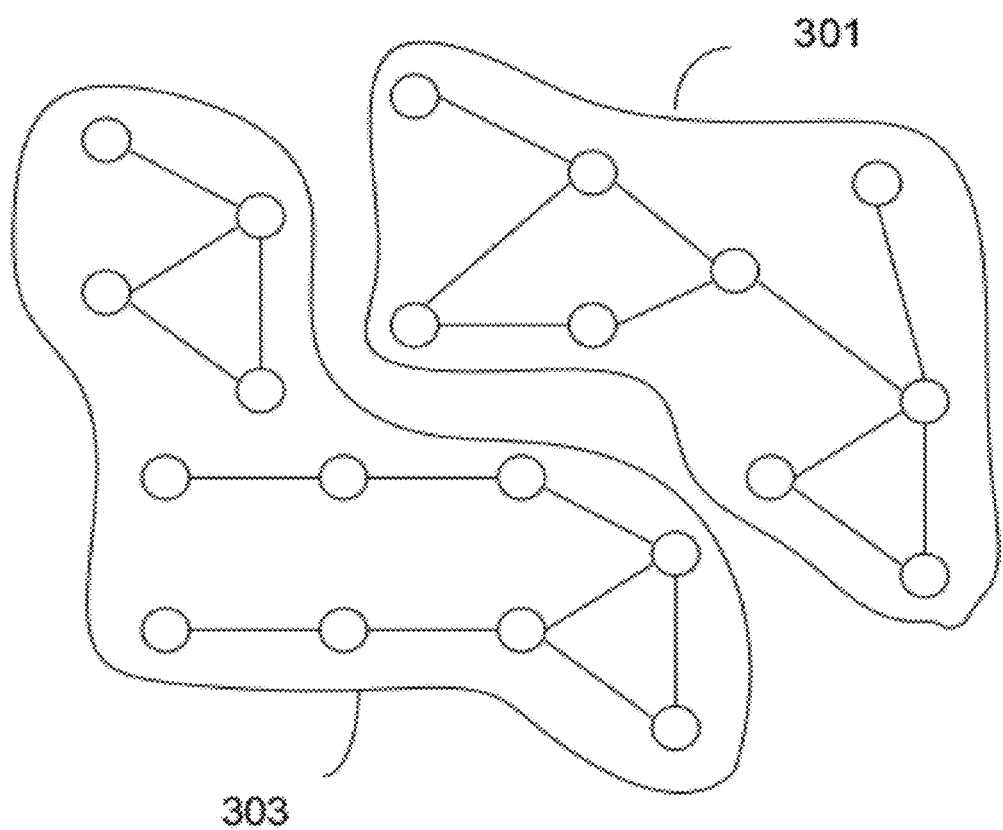
FIG. 3 is a diagrammatic representation showing two clock domains with and without disjoint sub-graphs in accordance with various embodiments of the present invention.

In FIG. 3, there are two clock domains (301 and 303). According to various embodiments, the 303 clock domain has two disjoint sub-graphs that can be optimized independently and, hence, should be put in separate relaxation groups by the disjoint-graph identification procedure. In particular embodiments, the 301 clock domain has no disjoint sub-graphs, so the disjoint-graph identification procedure will only use a single relaxation group for this clock domain.

A generalization of the disjoint-graph identification would be to look for edges with proportionally large slacks or slack ratios and consider them as equivalent to a non-timing-constrained edge. In general, two portions of a design that are only tied together with high slack or slack ratio edges, can also generally be optimized independently. Similarly, if two portions of the timing graph are coupled through a series of moderately large slack or slack ratio edges, they can also generally be optimized independently. Consequently, when looking for independence (relaxation boundaries), algorithms may consider the magnitude of the edge slacks or slack ratios and the number of hops between portions of the design. Larger slacks or slack ratios generally imply more independence, as do more hops.

One sample algorithm for finding these relaxation groups based on the aforementioned criteria will be described. It works by examining the slacks or slack ratios associated with the edges of a timing domain or sub-domain. In some embodiments, the algorithm uses slacks or slack ratios which are a function of only the respective timing domain (or sub-domain). But it can also optionally make use of slacks or slack ratios that are a function of all timing domains to assess how tightly coupled portions of the timing graph are. Generally, basing the analysis only on the respective timing domain (or sub-domain) is more convenient because it does not require analysis of all domains to compute the relaxed slack or slack ratios of the respective domain (or sub-domain).

The algorithm first sorts or partially sorts the edges in the timing domain (or sub-domain), based on the slacks or slack ratios that are a function of only the respective timing domain (or sub-domain). It then iterates through the edges starting with the lowest slack or slack ratio edges. From each of those edges, it traverses outwards through the timing graph, looking for all the nearby edges that should be relaxed in the same group as the initial edge. It is looking for edges whose optimization may tradeoff with the optimization of the initial edge. Hence, relaxation of the edges as a group should allow the optimization algorithm to focus on the optimization of the more critical edges, potentially at the expense of the less critical edges in the group. To achieve this, it should traverse through edges with low slacks or slack ratios that may or may not be a function of all timing domains. Once it reaches an edge with a slack or slack ratio above a slack threshold or a pre-determined threshold it should include that edge in the group, but not traverse beyond it. This is done for every "search path" away from the initial edge. The pre-determined threshold may be an absolute threshold, a threshold based on the achieved or required clock period, or a function of the slack or slack ratio of the initial edge being expanded from to guide the search to find a relatively "non-critical boundary".

Figure 4A:
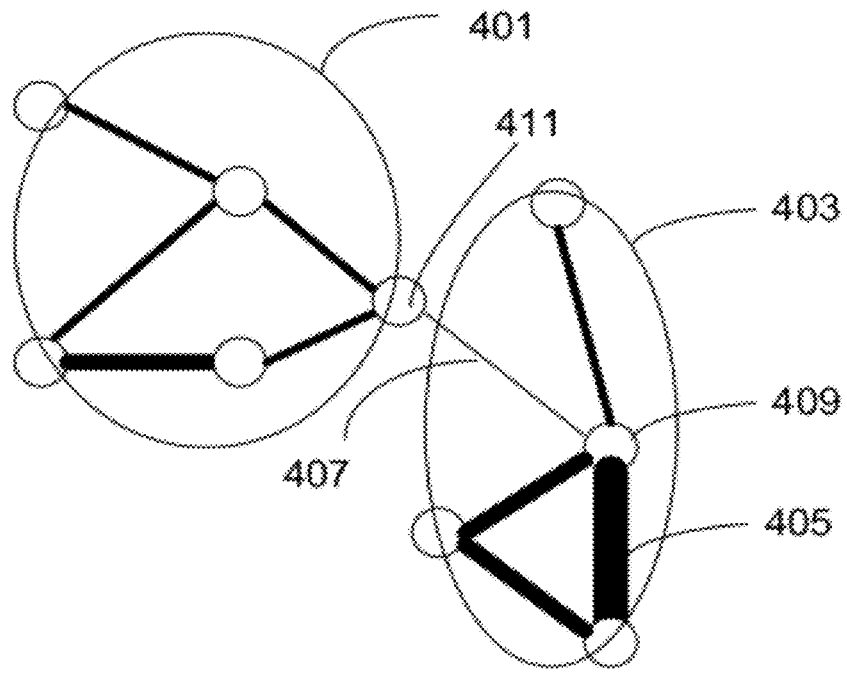
FIGS. 4A and 4B are timing graph representations showing optimization of a group having different slack or slack ratios within the group in accordance with various embodiments of the present invention.

In FIG. 4A and subsequent figures, edge thickness is used to illustrate low slack or slack ratio (critical) edges that should be optimized. In FIG. 4A, thicker lines represent less slack. The circled groups of edges (groups 401 and 403) will end up in separate relaxation groups. The algorithm starts with the thickest (most critical) edge 405 in the bottom right. It expands along the moderately thick edges until it gets to the thin edge 407 in the center which represents a relatively high slack edge. That edge effectively represents a break in the timing graph because the two nodes at its end points (409 and 411) are only weakly coupled by this edge. Consequently, the optimization of the circled group of edges 403 (and the relevant logic) should be independent of the rest of the timing graph, so if this group of edges is relaxed, the critical edge should end up being optimized as well as if the entire clock domain was in a single relaxation group. Note that the relaxation group includes just what it needs to enable further optimization of the critical edges within it. In essence, the algorithm tries to secure a "non-critical buffer" around critical portions of the design to facilitate further optimization. The benefit of finer grainer relaxation is the critical edges in the second relaxation group to the left will be optimized in accordance to how much they are failing the user timing constraint, whereas conventional relaxation-based techniques would not consider those edges as important to optimize until the timing of the lower-right paths is improved.

In some embodiments, the algorithm may facilitate the outward search from the initial edge using a heap which prioritizes expanding certain edges before others. The score of an edge in the heap can be a function of the slack or slack ratio of the edge and a function of the score of the edge that led to this edge. One possible score is a sum of conventional relaxed slack ratios or an approximation, and the algorithm can expand the lowest score edge in every iteration. Once the scores reach a certain value, the algorithm can avoid expanding further because it has found independent portions of the timing graph. By using the aforementioned sum as a score, the algorithm can notice independence based on a short path of edges with large slack or a long path of edges with moderate slack. In this case, the term "path" is used to describe a sequence of edges traversed during relaxation group formation, rather than referring to a timing path.

In some embodiments, the tradeoff between path length and slack can be adjusted by raising the slack ratios to an exponent before summing them. Note that by expanding the lowest-score edge every iteration, the algorithm tries to reduce the number of re-traversals. Edges would have to be re-traversed if the first path taken to reach a node translates into a higher score for the node than the second path taken to reach the same node. That is because the second path taken to reach the same node would need to "secure" more slack before stopping.

Figure 4B:
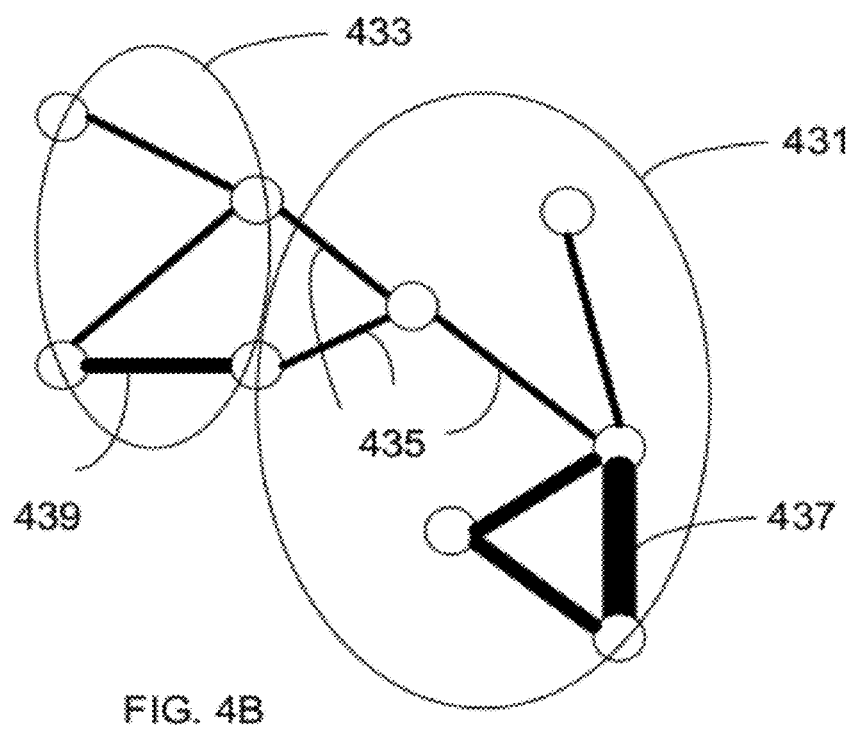

In FIG. 4B, the relaxation group 431 formed around the critical edge in the bottom-right is expanded to include a longer path of edges 435 of moderate-to-high slack (rather than a single edge of high slack) in order to facilitate optimization of the critical edge 437. Notice that despite this, the moderately critical edge 439 in the left relaxation group 433 will still be optimized more effectively than if the entire clock domain was relaxed as a single group.

Note that instead of using standard timing-analysis-produced slacks or slack ratios, allocated slack or an estimate of allocated slack can be used instead. To compute allocated slack, "standard" path slack is allocated to the various edges corresponding with each path. There are known techniques to perform slack allocation or an approximation of slack allocation. Note that "standard" slacks indicate how much delay increase an edge can tolerate assuming only that edge is changed in isolation. By using allocated slack, scores can be computed as a function of how much delay increase edges can tolerate, assuming other edges change as well.

In some embodiments, other metrics for timing can be used in place of slacks and slack ratios in the above discussion. Any metric which is a measure of how coupled two blocks are can substitute when trying to determine independence for relaxation group formation, however, in general, similar metrics to those used during optimization should be used. Once the outward traversal from an edge is complete, the relaxation group around that edge will be defined. The algorithm can then proceed to define a relaxation group to encompass the next most critical edge that is not already included in some relaxation group. Note that in this embodiment, the relaxation groups are mutually exclusive and cover all the relevant edges in the timing domain.

Therefore, once an edge is included in a relaxation group, it should be excluded from other relaxation groups. This is the motivation for choosing the lowest slack or slack ratio edge to start each search from. By building relaxation groups for the most critical edges first, their relaxation groups can include edges around them that will be relaxed according to the slacks or slack ratios of the most critical edges in the relaxation group, as opposed to what would happen if they were included in a relaxation group with less critical edges. The benefit of grouping them with the more critical edges is they can be used to "free up" the most critical edges to optimize further at the expense of their own delay, by relaxing them to a greater extent.

Figure 5A:
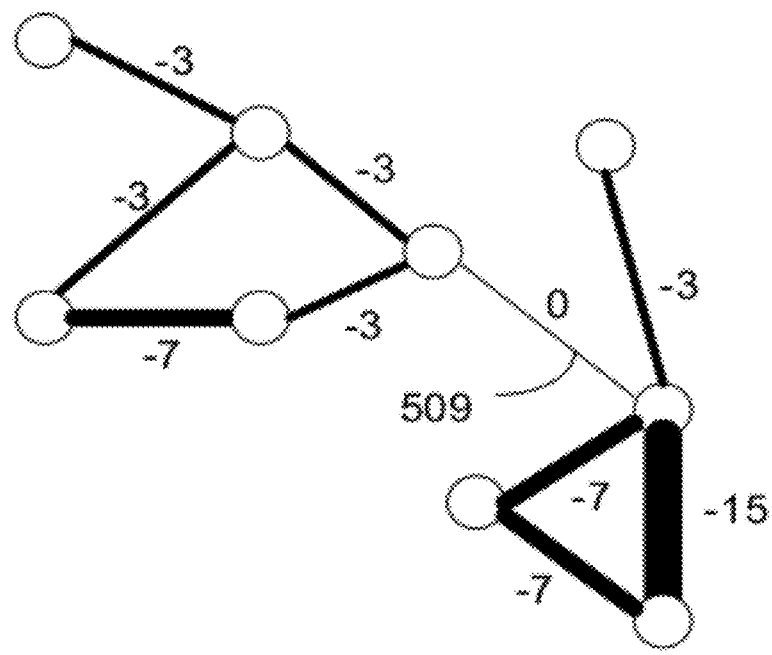
FIGS. 5A-5D are timing graph representations showing optimization of a group having different slack or slack ratios within the group in accordance with various embodiments of the present invention.
Figure 5B:
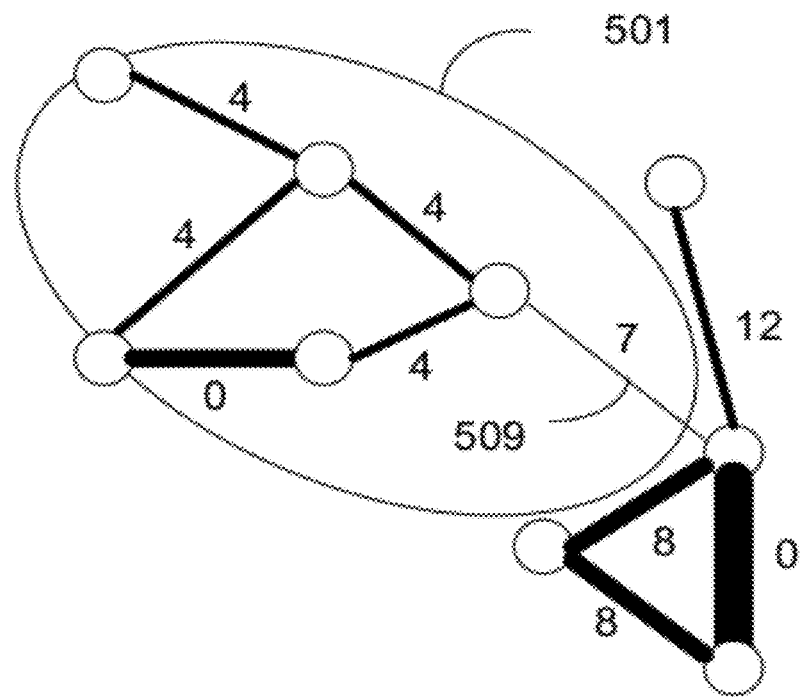

To illustrate, slacks are shown for the various edges in the timing graph of FIG. 5A based on a clock-period requirement of 1. Consider what might happen if the most critical edge was not processed first. A relaxation group 501 might be formed around the top-left part of the timing graph which includes the 0-slack edge 509, and a second relaxation group might be formed around the bottom-right part of the timing graph (excluding the 0-slack edge 509). This would result in the "relaxed" slacks of FIG. 5B.

Figure 5C:
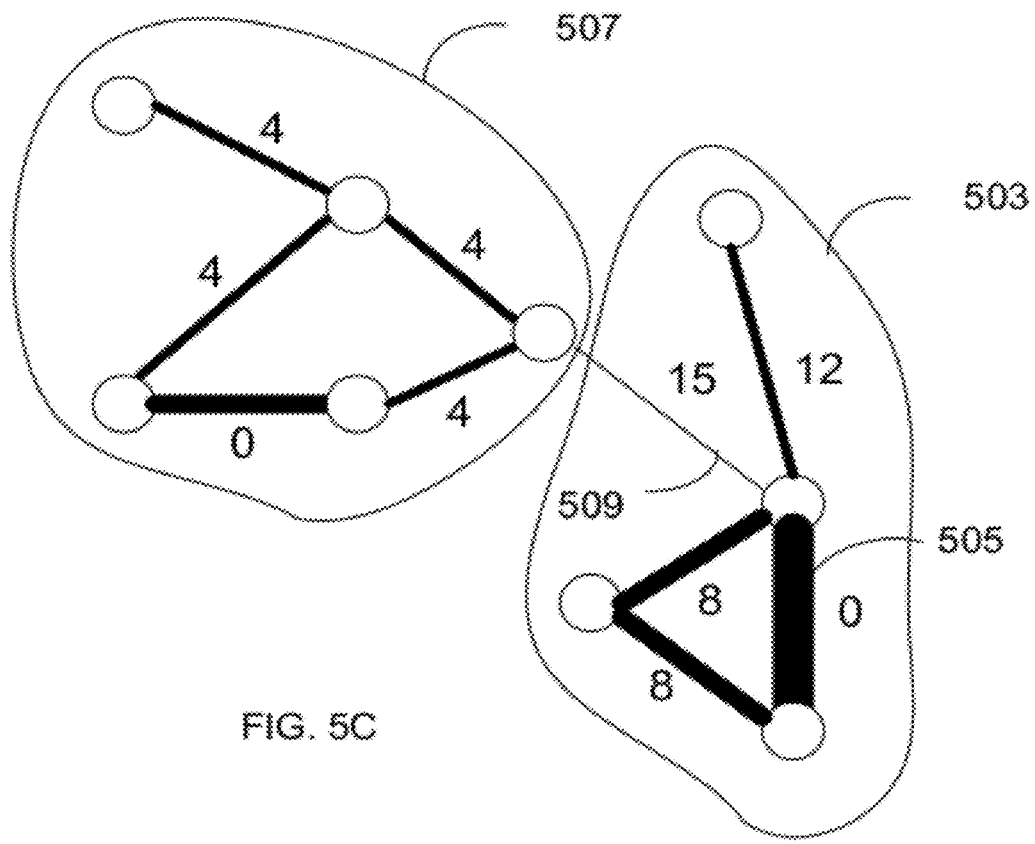

By contrast, if the critical edge 505 is processed first. A relaxation group 503 will be formed around the bottom-right part of the timing graph which includes the 0-slack edge 509, and a second relaxation group 507 will be formed around the top-left part of the timing graph (excluding the 0-slack edge). This would result in the "relaxed" slacks of FIG. 5C. Notice that the 0-slack edge 509 ends up with a relaxed slack of 15 with this choice of relaxation groups rather than 7 from FIG. 5B, with the choice of relaxation groups above. This gives more flexibility to optimize the critical edge 505.

Figure 5D:
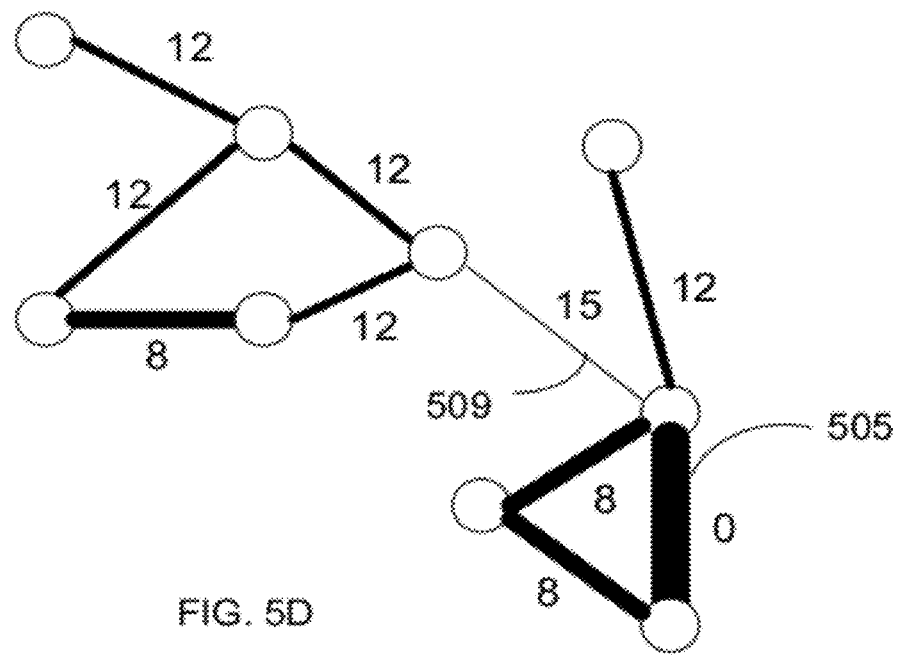

As another point of comparison, consider the "relaxed" slacks of FIG. 5D that conventional relaxation-based techniques would produce. Notice that even though the 0-slack edge 509 ends up with a "relaxed" slack of 15 which facilitates optimization of the critical edge 505, the slacks of the edges in the upper-left of the graph are much larger. These edges are unlikely to be optimized (most likely they will be de-optimized), even though they are failing timing and could be better improved without hindering critical-path optimization.

It should be clear that the purpose of the relaxation groups is to make more timing marginal paths appear as important to optimize, but still relax enough competing (but relatively non-critical) paths around the critical paths to facilitate optimization of the respective portions of the design.

The techniques so far have focused on inter-relationships established by the timing graph. However, many optimization algorithms do not optimize finely enough to trade off delays solely at the timing graph level. For example, clustered placement is a common optimization technique where a group of blocks may be moved at once. Also, many timing graphs are much finer than a single block which may consist of edges representing intra-block dependencies and nodes representing block input and output ports. In these cases, there can be inter-relationships between timing graph edges that are non-adjacent to one another. To account for these relationships, when expanding outward from an edge, non-adjacent edges may be added to the heap, or other structure that is managing edges to search through next, based on these relationships.

Similarly, there may be inter-relationships between optimization alternatives because they would contend for resources. For example, two blocks during placement that are disjoint in terms of optimization and that are relatively distant in the timing graph, but require the resources at the same location for improved optimization. Also, certain algorithms like synthesis and routing may need to make tradeoffs between various inputs in cones of logic that may be relatively distant in the timing graph. To account for these inter-relationships, the non-adjacent edges that are associated with a given edge may include edges that compete for resources; for example, we may want to consider all the blocks and the associated edges currently placed in a given region of the device during placement, and/or all the connections and the associated edges currently being routed through a given region of the chip during routing.

A timing-graph-centric approach can also lead to false relationships. This can happen if the optimization algorithm can not make tradeoffs between adjacent edges. For example, during placement a block may be constrained to a particular location, in which case, it may be unfavorable to group edges attached to the block in the same relaxation group. The optimization of each of the edges attached to the immobile block is likely independent (other blocks need to migrate towards the respective block to optimize those edges). Another example is routing where routed connections attached to a block often do not directly tradeoff against one another, but rather compete for resources in a similar region of the device. In these cases, the algorithm may go as far as ignoring the timing graph completely and relying on the other proximity heuristics discussed above, or similar ones.

Some embodiments may rely on the timing graph, but avoid expanding through independent portions of the timing graph, like through blocks that are location constrained. In some cases, expansion may be asymmetric. For example, if a block is location constrained to a region of the chip, but it is already placed at one side of that region, then movement of that block can not improve some edges that lie beyond the region. To consider that during the expansion, when expanding from some of the edges that can not be improved, the other edges attached to the block should not be considered because their de-optimization can not benefit the critical edge, i.e. the block can not move. It is only useful to include other edges that may de-optimize to benefit the critical edges in a relaxation group. However, the inverse is not always true. When expanding from some edges that can be improved, the other edges attached to the block that can not be improved should be considered, because they can be de-optimized to improve the other edges.

Figure 6A:
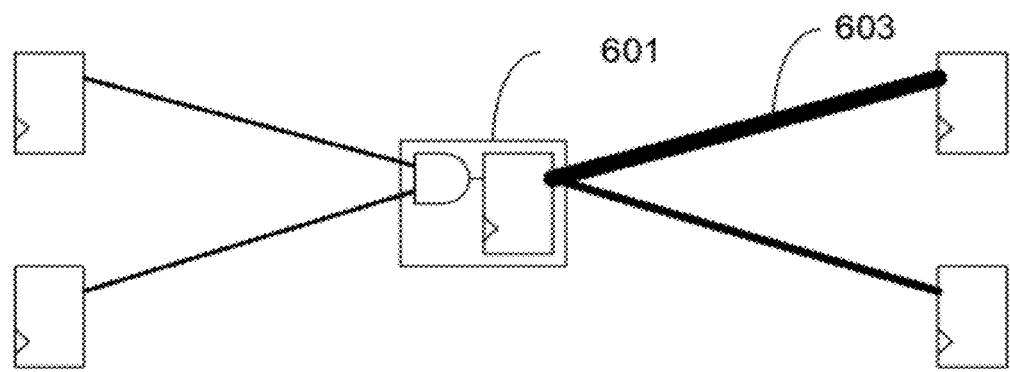
FIGS. 6A-6D are timing graph representations showing optimization of a group having location constraints and different slack or slack ratios within the group in accordance with various embodiments of the present invention.
Figure 6B:
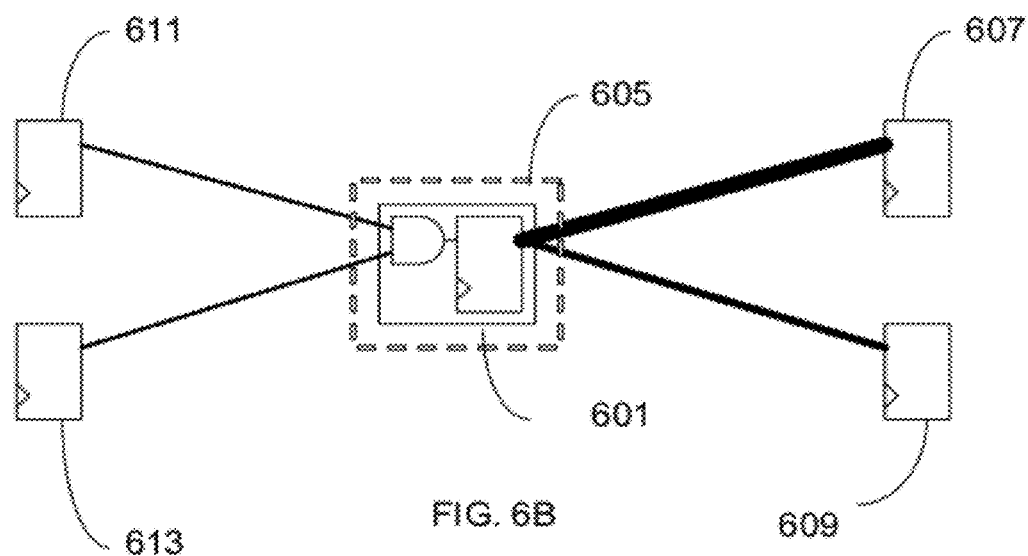

Consider timing graph of FIG. 6A, all the edges should be in the same relaxation group, because the block 601 in the middle can move to help optimize the critical edge 603, and the other edges should be relaxed to facilitate that. In another example as shown in FIG. 6B, the block 601 in the middle is location constrained, as shown by the dotted line box 605 and cannot move to help optimize the critical edge (or any other edge), so all the edges, if they can be optimized, have the potential to be optimized independently (by moving the outer blocks 607, 609, 611, and 613). Consequently, all the edges should be in separate relaxation groups.

Figure 6C:
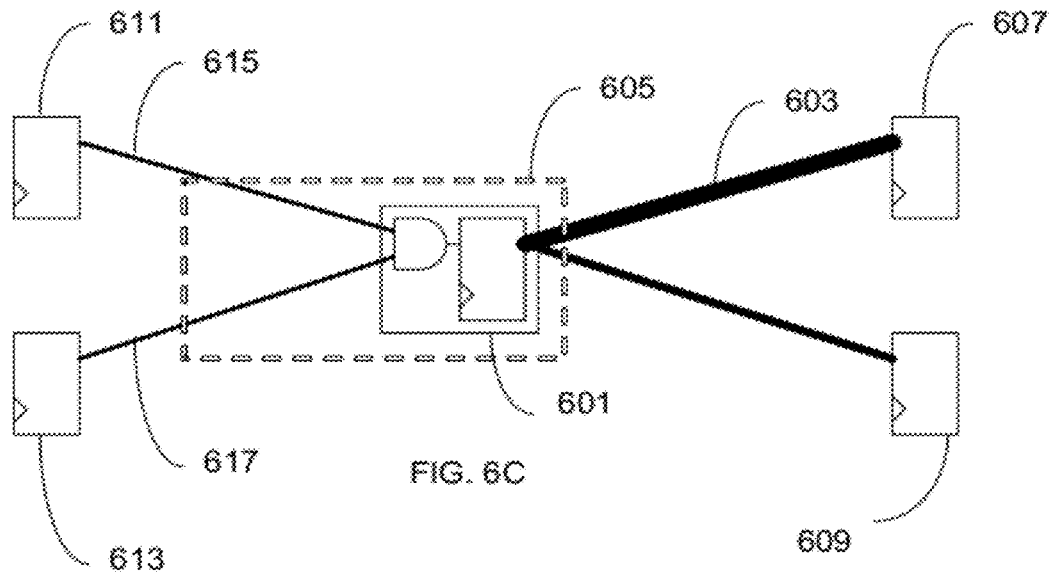

FIG. 6C shows yet another example of location constraint. The block 601 in the middle can only move to the left, as shown by dotted box 605. Consequently, the relaxation group (603 and 607) of the critical edge 603 may not be expanded to include the other edges because they can not be de-optimized to benefit the critical edge 603. The optimization of the critical edge will be achieved only by the movement of the upper-right block 607. That said, the relaxation group may be expanded to include the edges to the left (615 and 617) because, otherwise, they might "entice" the middle block to move, de-optimizing the critical edge 603. While expanding the relaxation group can avoid de-optimization of the critical edge, adjusting the extent to which the group(s) that contain the edges on the left are relaxed can also achieve this.

Figure 6D:
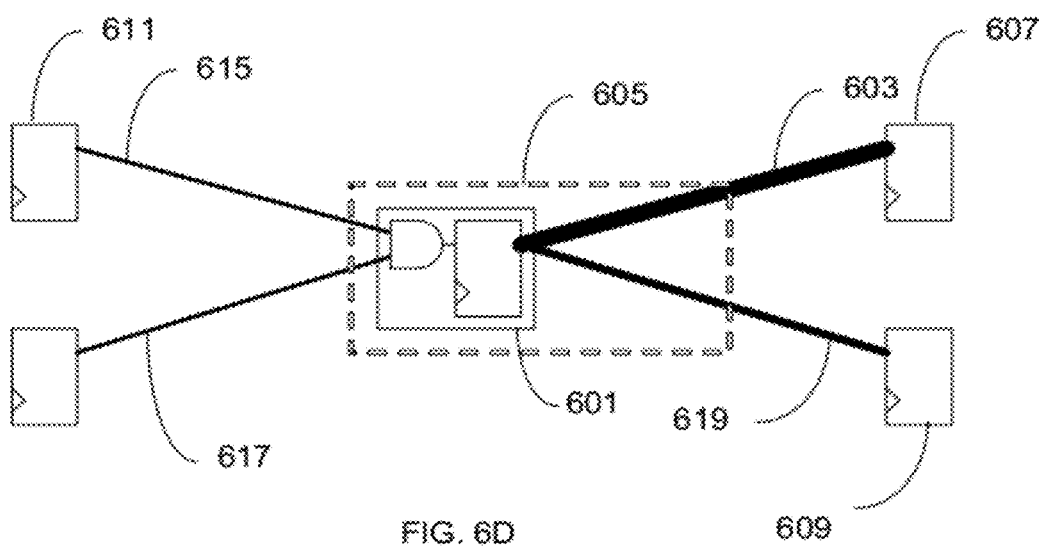

In FIG. 6D, the block 601 in the middle can only move to the right, as shown by dotted box 605. Consequently, the relaxation group of the critical edge 603 should be expanded to include, at least, the edges on the left (615 and 617) because they can be de-optimized to benefit the critical edge 603. It may be preferable not to include the bottom-right edge 619. The middle block 601 can not move up or down, so there is no danger of the bottom-right edge "enticing" the de-optimization of the critical edge 603, and by not including the bottom-right edge 619 in the same relaxation group, it can be better optimized (by moving the bottom-right block 609, in addition to the middle block 605).

Embodiments described pertain to finding a "non-critical" buffer of edges by searching away from an initial edge. The search continues until a buffer of edges is found on all search paths away from the initial edge. However, for many optimization algorithms (for example, placement), both endpoints of the edge do not need to be "freed up" to facilitate optimization of the edge delay. Either of the endpoints can be utilized to optimize the edge delay or both endpoints can be partially used to optimize the edge delay. Consequently, when performing the search to identify the relaxation group, rather than searching so that enough slack is found for each of the endpoints independently, the search can continue until the total slack or slack ratio associated with both endpoints exceeds a certain threshold.

Figure 7A:
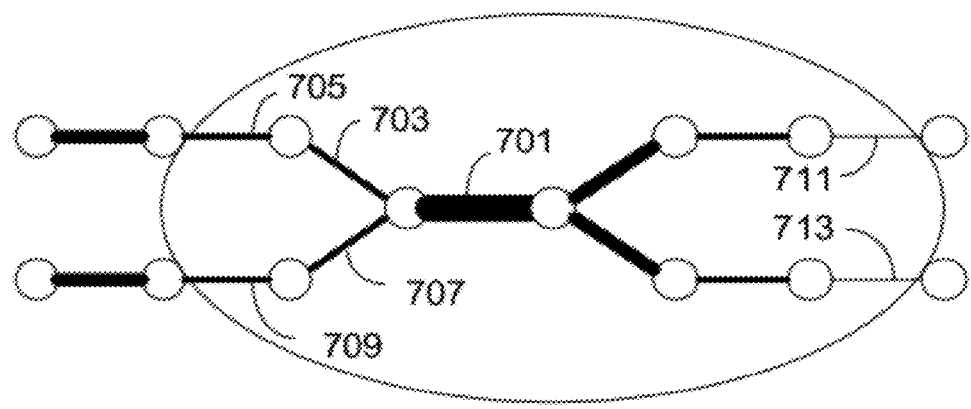
FIGS. 7A-7C are timing graph representations showing optimization of a group having multiple paths away from a critical edge and different slack or slack ratios within the group in accordance with various embodiments of the present invention.

In FIG. 7A, the search away from the critical edge 701 in the middle continues until the left expansion goes through a sequence of two lower-criticality edges (703/705 and 707/709) on the two respective paths. The right expansion continues until the really-low-criticality edges (711 and 713) are found on the right; if it stops any earlier, the right expansion would not have found enough slack when evaluated independent of the left expansion.

Figure 7B:
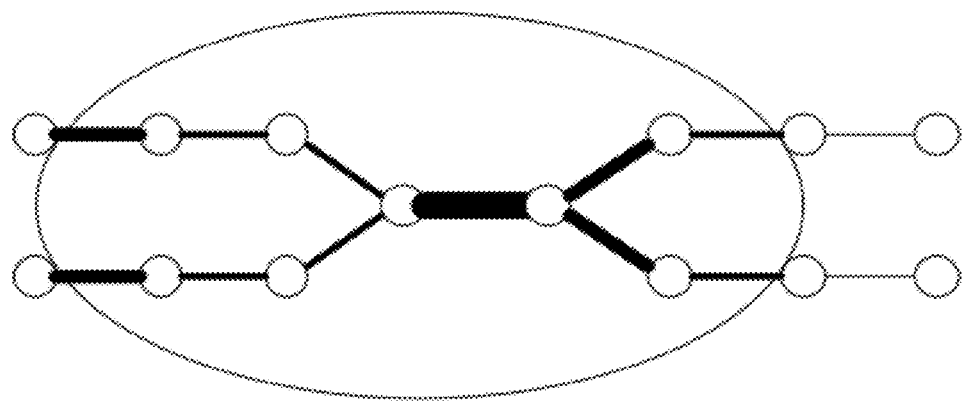
Figure 7C:
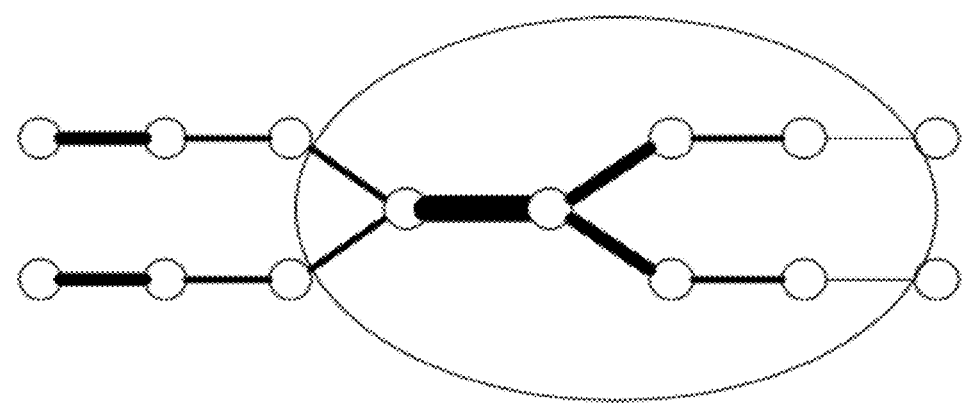

In FIGS. 7B and 7C, the search away from the critical edge in the middle continues until the left and right expansions together find enough slack to facilitate optimization of the critical edge in the middle. Note that a variety of possible solutions exist for the same timing graph, as shown in FIGS. 7B and 7C.

The search can also be directed to find the minimum set of edges for a relaxation group. One simple heuristic is to conduct two separate searches from both endpoints, and favor focusing on searching from the endpoint that appears to already have more slack. Other approaches may also be used where solutions are back-tracked to minimize the size of the relaxation group if one endpoint ends up with more slack than anticipated earlier in the search. Note that the precise algorithm used here is not too important because determining ideal relaxation groups is not necessary—relaxation groups are a heuristic themselves. Iterative algorithms may compute many sets of relaxation groups as the algorithms proceed, so a perfect answer for any given iteration is unnecessary. Furthermore, in most cases, the common topologies of interest occur when an endpoint has a number of high slack or slack ratios edges immediately attached, so no sophisticated search is needed—the answer is available from a relatively shallow traversal.

Note that limiting the extent of the search for edges in a relaxation group also applies to cases where the relaxation group expansion is done for reasons other than timing-graph adjacency.

In other related embodiments, inter-dependencies between edges can be inferred and quantified based on design hierarchy, and other optimization objectives besides timing such as designer-imposed grouping constraints. Also, other techniques such as bottom-up clustering and top-down partitioning can be leveraged to help find boundaries to guide the search for relaxation groups.

Once the relaxation groups have been determined, the slacks and, in turn, the slack ratios can be computed, adjusted, or re-computed. Note that not all the edges of a path may be included in a relaxation group. Only a portion of a timing path may be included, but for the purposes of "relaxed" slack computation, it may be necessary to traverse beyond the boundaries of the relaxation group to find the current arrival times associated with the respective coupled timing constraints. Once the arrival times are determined, the relaxed set of coupled timing constraints can be determined and, in turn, the "relaxed" slacks and slack ratios. Alternatively, the slacks or slack ratios can be relaxed through linear re-mappings or shifts where slacks (or slack ratios) below 0 are re-mapped or shifted to 0, slacks (or slack ratios) equal to the user requirement (or the normalized user requirement) are re-mapped or shifted to be equal to the relaxed requirement (or 1), and slacks or slack ratios in between are linearly interpolated.

As was mentioned earlier, in the example with competing relaxation groups, it may be beneficial to relax the edges in a group more than the most critical edge in the group would dictate. The idea is to use a requirement somewhere in between that dictated by the most critical path in the group and the requirement that would be used by conventional relaxation-based techniques. In particular, the relaxed requirement chosen for a relaxation group can be such that it does not encourage the de-optimization of critical edges in adjacent relaxation groups, but it leads to better optimization of the contents of this relaxation group than would be achieved by conventional techniques.

There may be other techniques for computing slacks and slack ratios that are suitable for optimization of a group of edges in a relaxation group. Those may include truncation, piece-wise linear scaling, and non-linear mappings, as alternatives to the linear-interpolation example described. And those techniques can be used in conjunction with a variety of optimization algorithms. Note that the techniques described for determining a group of edges suitable for relaxation is orthogonal to these slack and slack ratio calculations and the optimization algorithms. The relaxation group techniques try to strategically partition a design into portions that can be optimized independently to help facilitate optimization that achieves all the aforementioned benefits. These techniques can be used with any algorithm that performs or facilitates optimization of a portion of a design, considered independent of other portions of the design.

While conventional relaxation-based techniques enables effective design optimization when there are a large number of timing violations either because of user over-constraining or because the CAD tool is in the early phases of design optimization, the techniques in this disclosure preserve these benefits while enabling more effective and efficient design optimization. This is achieved by finding portions of designs that can be optimized independently and computing the necessary slacks and/or connection weights to better guide the optimization algorithms.

Various embodiments in accordance with the present invention are very beneficial for modern logic design where many user design iterations (invocations of a CAD tool) may be run on incomplete and suboptimal versions of a logic design, often with incorrect or incomplete timing constraints. The conventional relaxation-based approach often suffers from effectively giving up on large portion of a design because the critical logic can not be further optimized. For example, module B is not optimized well, because module A is missing timing by a large margin and both module A and B are subject to the same coupled set of timing constraints (same clock domain). This can be inconvenient and frustrating for users.

Modern logic designs often include many independent cores and/or interconnect mechanisms that are challenging from a timing perspective. The conventional relaxation-based technique tends to suffer from taking too long to optimize such a design because only the most critical paths at any point during optimization are subject to optimization focus, so it can take a while to close timing on the whole design. This can lead to long compile times, and/or poor optimization quality, necessitating numerous design iterations.

Figure 8:
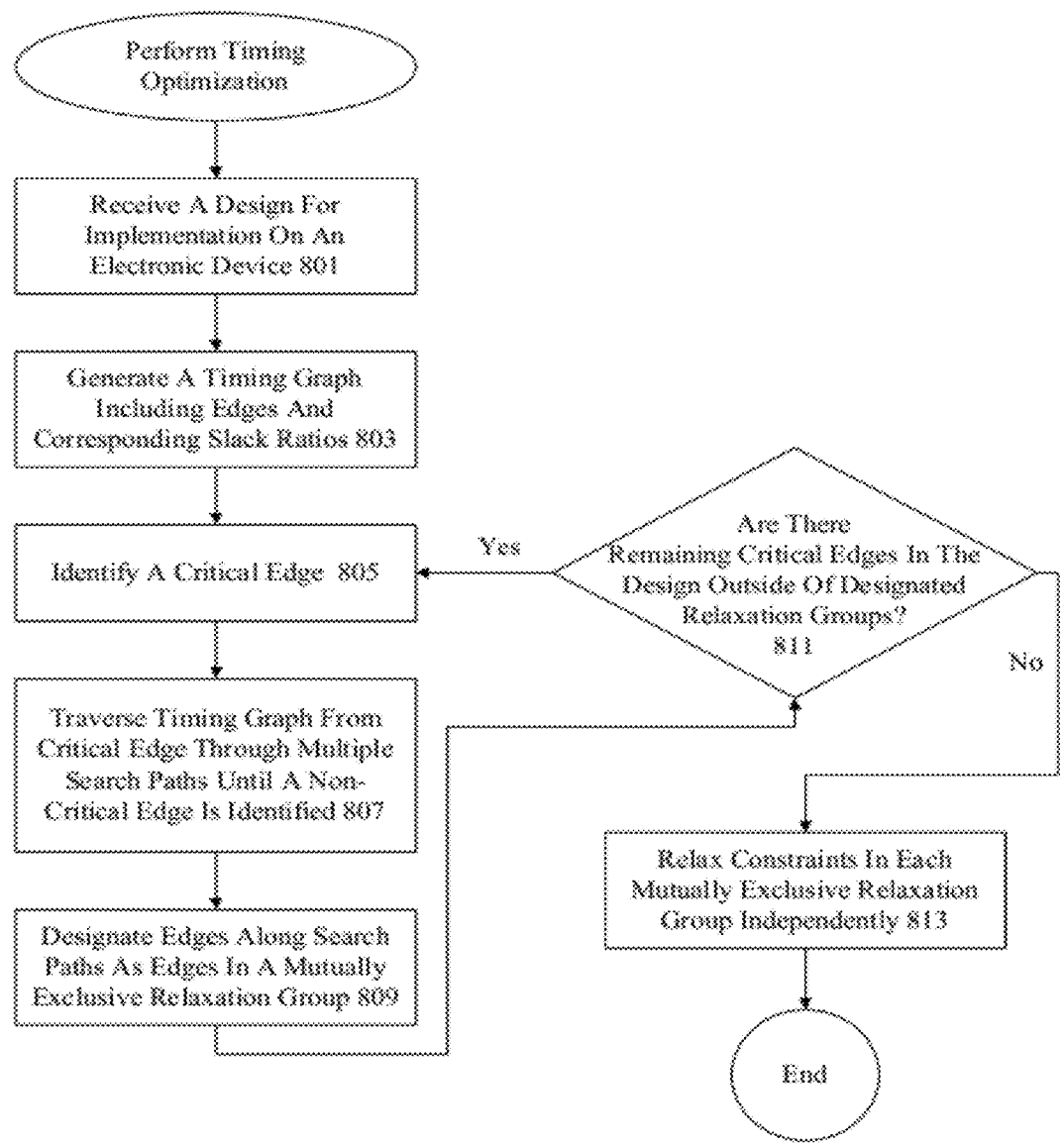
FIG. 8 is a process flow diagram illustrating a technique for performing timing optimization.

FIG. 8 illustrates one example of a technique for performing timing optimization for an electronic design. At 801, a design is received. The design may be received as a logic description or may be block or logic based. According to various embodiments, a timing graph is generated at 803 to identify slack ratios and/or criticality of various edges between blocks. At 805, a critical edge is identified. In particular embodiments, the most critical edge having the lowest slack ratio is identified. At 807, the timing graph is traversed from the critical edge through multiple search paths until one or more non-critical edges are identified. According to various embodiments, a non-critical edge is an edge reaching a particular slack threshold. In particular embodiments, the slack threshold is an absolute threshold. In other examples, the slack threshold is based on the achieved or required clock period. In still other examples, the slack threshold is a function of the slack ratio of the critical edge to guide the search to find a relatively non-critical boundary.

At 809, edges along search paths from the critical edge to one or more non-critical edges are designated as edges in a particular relaxation group. According to various embodiments, relaxation groups are mutually exclusive. At 811, it is determined if there are remaining critical edges in the design. If there are remaining critical edges, process steps are repeated to generate additional relaxation groups. Otherwise, constraints in each relaxation group are relaxed and independently optimized for at 813.

Figure 9:
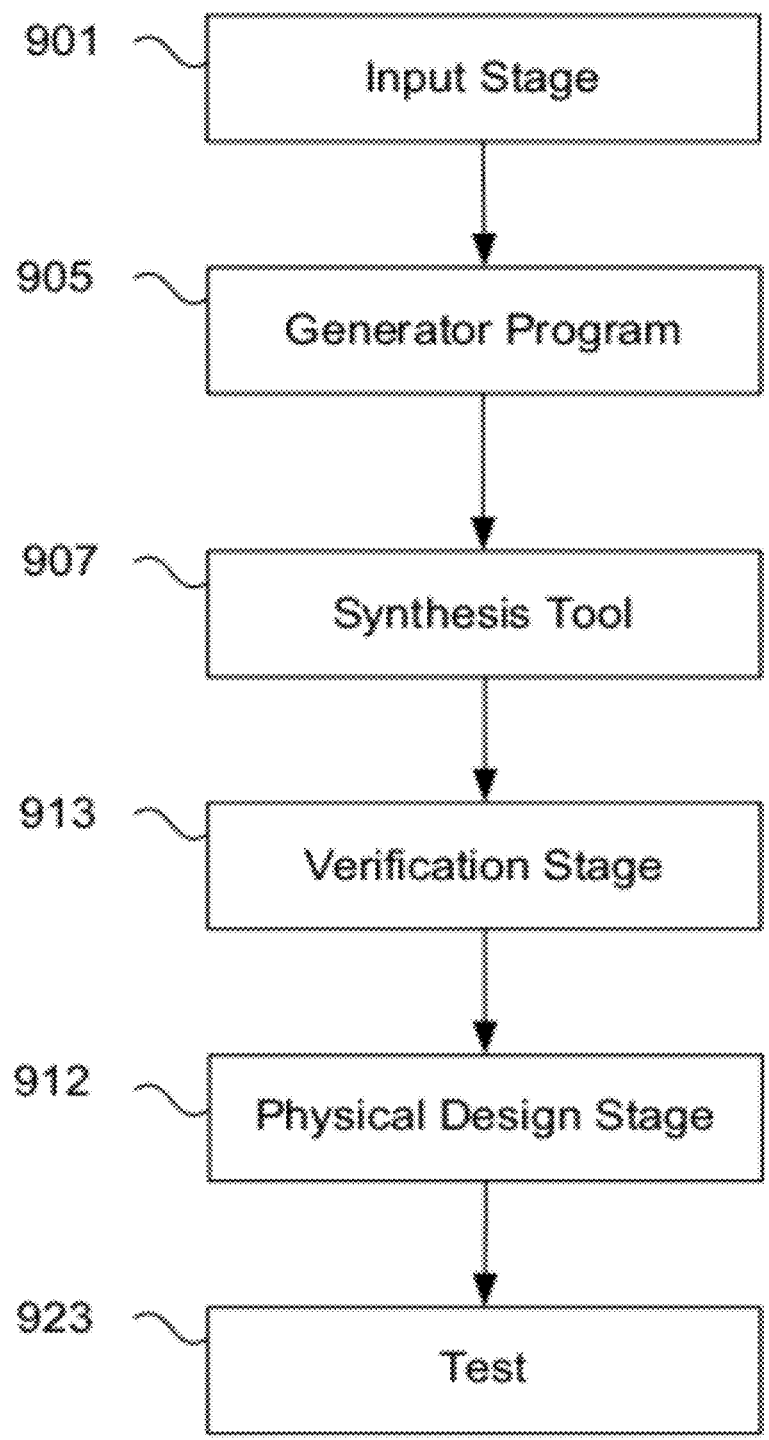
FIG. 9 is a graphical representation depicting a logical view and its corresponding physical view in accordance with various embodiments of the present invention.

A design process is described with reference to FIG. 9 to provide context for the disclosure. FIG. 9 is a diagrammatic representation showing implementation of a device. An input stage 901 receives selection information typically from a user for logic such as a processor core as well as other components such as a streaming output device to be implemented on an electronic device. In one example, the input received is in the form of a high-level language program. A generator program 905 creates a logic description and provides the logic description along with other customized logic to any of a variety of synthesis tools, place and route programs, and logic configuration tools to allow a logic description to be implemented on an electronic device. In one example, an input stage 901 often allows selection and parameterization of components to be used on an electronic device. The input stage 901 also allows configuration of variable or fixed latency support. In some examples, components provided to an input stage include intellectual property functions, megafunctions, and intellectual property cores. The input stage 901 may be a graphical user interface using wizards for allowing efficient or convenient entry of information. The input stage may also be a text interface or a program reading a data file such as a spreadsheet, database table, or schematic to acquire selection information. The input stage 901 produces an output containing information about the various modules selected.

In typical implementations, the generator program 905 can identify the selections and generate a logic description with information for implementing the various modules. The generator program 905 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 905 identifies pointers and provides ports for each pointer. One tool with generator program capabilities is System on a Programmable Chip (SOPC) Builder available from Altera Corporation of San Jose, Calif. The generator program 905 also provides information to a synthesis tool 907 to allow HDL files to be automatically synthesized. In some examples, a logic description is provided directly by a designer. Hookups between various components selected by a user are also interconnected by a generator program. Some of the available synthesis tools are Quartus® Integrated Synthesis (QIS) from Altera Corporation of San Jose, Calif., Precision Synthesis, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 901, generator program 905, and synthesis tool 907 can be separate programs. The interface between the separate programs can be a database file, a log, or simply messages transmitted between the programs. For example, instead of writing a file to storage, the input stage 901 can send messages directly to the generator program 905 to allow the generator program to create a logic description. Similarly, the generator program can provide information directly to the synthesis tool instead of writing HDL files. Similarly, input stage 901, generator program 905, and synthesis tool 907 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDIF file). An EDIF file is one example of a synthesized netlist file that can be output by the synthesis tool 907.

A synthesis tool 907 can take HDL files and output EDIF files or other netlist description formats such as structural VHDL or structural Verilog. Tools for synthesis allow the implementation of the logic design on an electronic device. Various synthesized netlist formats will be appreciated by one of skill in the art.

A verification stage 913 may precede or follow the synthesis stage 907. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 913, the synthesized netlist file can be provided to physical design tools 912 including place and route and configuration tools. A place and route tool typically locates logic cells on specific logic elements of a target hardware device and connects wires between the inputs and outputs of the various logic elements in accordance with logic required to implement an electronic design. This is usually followed by a final timing analysis step to sign off on the timing constraints, now that all the actual timing paths between sequential elements on the device are known. The device can also be physically tested at 923.

For programmable logic devices, a programmable logic configuration stage can take the output of the place and route tool and generate a bit stream that is used to program the logic device with the user selected and parameterized modules. According to various embodiments, the place and route tool and the logic configuration stage are provided in the Quartus® Development Tool, available from Altera Corporation of San Jose, Calif.

As noted above, different stages and programs can be integrated in a variety of manners. According to one embodiment, the input stage 901, the generator program 905, the synthesis tool 907, the verification tools 913, and physical design tools 912 are integrated into a single program. The various stages may be automatically run and transparent to a user. The program can receive the user selected modules, generate a logic description depicting logic for implementing the various selected modules, and implement the electronic device. Various stages may be repeated in an iterative process to troubleshoot and optimize a design. It is common for a design to be compiled many times before it is finalized.

As PLD technology advances, the designs get larger and more complex. These larger and more complex designs make compiles longer and timing closure harder and may require many developers working together on a team. Advanced design and optimization techniques as disclosed herein are used to aid designers of large and complex designs.

Figure 10:
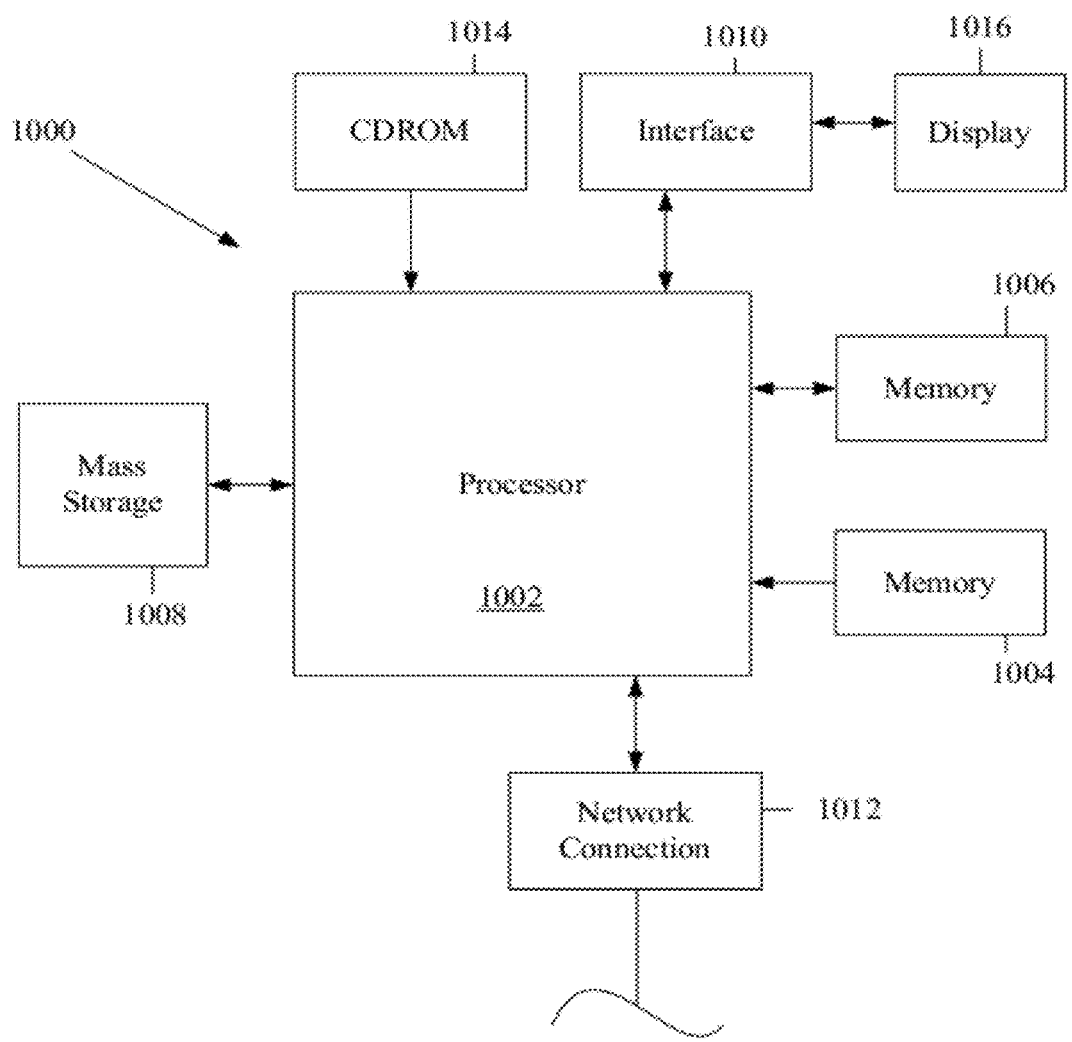
FIG. 10 is a diagrammatic representation depicting a computer system.

The techniques described herein may be implemented on a computing or processing system. An example is shown in FIG. 10. Various instructions to perform the techniques as described may be stored on tangible computer readable mediums, e.g., mass storage device, internal memory, or diskettes. The graphical presentation of various views as described may be displayed on a display connected to the general purpose computer while the instructions are executed on a personal computer or a server through a network connection.

FIG. 10 illustrates a typical computer system that can be used to perform design optimization. The computer system 1000 includes any number of processors 1002 (also referred to as central processing units, or CPUs) that are coupled to devices including memory 1006 (typically a random access memory, or "RAM") and memory 1004 (typically a read only memory, or "ROM"). As is well known in the art, memory 1004 acts to transfer data and instructions uni-directionally to the CPU and memory 1006 is used typically to transfer data and instructions in a bi-directional manner.

Both of these memory devices may include any suitable type of the computer-readable media described above. A mass storage device 1008 is also coupled bi-directionally to CPU 1002 and provides additional data storage capacity and may include any of the computer-readable media described above. The mass storage device 1008 may be used to store programs, data and the like and is typically a secondary storage medium such as a hard disk that is slower than memory. The mass storage device 1008 can be used to hold a library or database of prepackaged logic or intellectual property functions, as well as information on generating particular configurations. It will be appreciated that the information retained within the mass storage device 1008, may, in appropriate cases, be incorporated in standard fashion as part of memory 1006 as virtual memory. A specific mass storage device such as a CD-ROM 1014 may also pass data uni-directionally to the CPU.

CPU 1002 is also coupled to an interface 1010 that includes one or more input/output devices such as displays 1016, e.g., video monitor, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1002 optionally may be coupled to a computer or telecommunications network using a network connection as shown generally at 1012. With such a network connection, it is contemplated that the CPU might receive information from the network, or might output information to the network in the course of performing the above-described process steps. It should be noted that the system 1000 may also be associated with devices for transferring completed designs onto a programmable chip. The above-described devices and materials will be familiar to those of skill in the computer hardware and software arts.

Although many of the tools and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, although PLDs and particularly FPGAs are used in the various examples, the present invention is not limited to an optimization involving an FPGA or even a PLD. The mechanisms and techniques as disclosed may be applied to electronic designs for implementation on other chips, e.g., custom-logic devices, standard-cell devices, ASICs, gate arrays, structured-ASICs, and ASSPs. In another example, the present invention may be practiced with design software. It is therefore intended that the invention be interpreted to include all variations and equivalents that fall within the true spirit and scope of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of master and slave components and should not be restricted to the ones mentioned above. It is therefore intended that the invention be interpreted to include all variations and equivalents that fall within the true spirit and scope of the present invention.

What is claimed is:

1. A method of implementing an electronic design, comprising:
    receiving a design for implementation on an electronic device;
    generating a timing graph including a plurality of edges with associated timing data, the timing graph generated using a processor;
    identifying a first relaxation group comprising a first plurality of edges in a clock domain, wherein identifying the first relaxation group comprises:
        identifying a first edge having a low slack or slack ratio;
        traversing the timing graph from the first edge through a first plurality of search paths until a second edge having a high slack or slack ratio is identified, wherein the high slack or slack ratio corresponds to a slack threshold, wherein the slack threshold is selected from the group consisting of an absolute threshold, based on the achieved or required clock period, and a function of the slack ratio of the initial edge being expanded from to guide the search to find a relatively non-critical boundary; and
        designating the plurality of edges in the first plurality of search paths from the first edge to the second edge as edges in the first relaxation group;
    identifying a second relaxation group comprising a second plurality of edges in the clock domain; and
    independently relaxing the timing data corresponding to the first plurality of edges and the timing data corresponding to the second plurality of edges during design optimization.

2. The method of claim 1, wherein the second edge is a boundary in the first relaxation group.

3. The method of claim 1, wherein the first relaxation group is bounded by a plurality of non-critical edges including the second edge.

4. The method of claim 1, wherein the slack threshold is an absolute threshold.

5. The method of claim 1, wherein the slack threshold is based on the achieved or required clock period.

6. The method of claim 1, wherein the slack threshold is a function of the slack ratio of the initial edge being expanded from to guide the search to find a relatively non-critical boundary.

7. The method of claim 1, wherein identifying the second relaxation group comprises:
    identifying a third edge having a low slack ratio, wherein the third edge is outside of the first relaxation group;
    traversing through the timing graph from the third edge through a second plurality of search paths until a fourth edge having a high slack ratio is identified, wherein the high slack ratio exceeds a slack threshold;
    designating the plurality of edges in the second plurality of search paths from the third edge to the fourth edge as edges in the second relaxation group.

8. The method of claim 7, wherein the fourth edge is a boundary in the second relaxation group.

9. The method of claim 7, wherein the second relaxation group is bounded by a plurality of non-critical edges including the fourth edge.

10. The method of claim 1, wherein bottom-up clustering is used to identify the first relaxation group.

11. The method of claim 1, wherein top-down partitioning is used to identify the first relaxation group.

12. The method of claim 1, wherein a plurality of mutually exclusive relaxation groups including the first relaxation group, the second relaxation group, and a third relaxation group are identified.

13. The method of claim 1, wherein independently relaxing the timing data comprises computing slacks or slack ratios based on a relaxed timing constraint for each of the plurality of relaxation groups.

14. The method of claim 1, wherein independently relaxing the timing data comprises linearly interpolating the slacks or slack ratios based on a function of the lowest slack or slack ratio edge in the relaxation group.

15. The method of claim 14, wherein independently relaxing the timing data comprises linearly interpolating the slacks or slack ratios based on a function of the lowest slack or slack ratio edge in the relaxation group and the lowest slack or slack ratio edge in the clock domain or design.

16. The method of claim 1, wherein the identifying a first relaxation group comprises identifying one or more disjoint subsets of edges in a clock domain and identifying the first relaxation group as one of the disjoint subsets.

17. The method of claim 1, wherein the first relaxation group includes a minimum number of edges.

18. The method of claim 1, wherein identifying the first relaxation group comprises calculating a score to quantify whether a suitable boundary was found and adding to the score based on the slacks or slack ratios of edges found by traversing away from a subset of edges in the relaxation group.

19. The method of claim 18, wherein the timing graph is traversed by expanding through the search path having the lowest score computed as a function of edge slacks or slack ratios.

20. The method of claim 1, wherein identifying the first relaxation group comprises adding edges to the relaxation group based on timing-graph adjacency.

21. The method of claim 1, wherein identifying the first relaxation group comprises adding edges to the relaxation group based on adjacency in the optimization problem search space.

22. The method of claim 1, wherein the identifying the first relaxation group comprises pruning edges from the relaxation group based on optimization constraints.

23. An apparatus comprising:
an interface configured to receive a design for implementation on an electronic device;
a processor configured to generate a timing graph including a plurality of edges corresponding to a plurality of slack or slack ratios, the timing graph generated using a processor, and identify a first edge having a low slack or slack ratio;
wherein the processor is further configured to traverse the timing graph from the first edge through a first plurality of search paths until a second edge having a high slack or slack ratio is identified, wherein the high slack or slack ratio corresponds to a slack threshold wherein the slack threshold is selected from the group consisting of an absolute threshold, based on the achieved or required clock period, and a function of the slack ratio of the initial edge being expanded from to guide the search to find a relatively non-critical boundary, and designate the plurality of edges in the first plurality of search paths from the first edge to the second edge as edges in a first relaxation group.

24. A method of implementing an electronic design, comprising:
receiving a design for implementation on an electronic device;
generating a timing graph including a plurality of edges with associated timing data, the timing graph generated using a processor;
identifying a first relaxation group comprising a first plurality of edges in a clock domain;
identifying a second relaxation group comprising a second plurality of edges in the clock domain; and
independently relaxing the timing data corresponding to the first plurality of edges and the timing data corresponding to the second plurality of edges during design optimization;
wherein a plurality of mutually exclusive relaxation groups including the first relaxation group, the second relaxation group, and a third relaxation group are identified.

* * * * *